April 14, 1964

R. E. LANG ETAL 3,129,388

CATHODE BIAS CLAMP

Filed Dec. 29, 1960

INVENTORS
R. E. LANG
C. H. SMITH

BY W. O. Quesenberry
Claude Funkhouser
David E. Everard
ATTORNEYS

April 14, 1964  R. E. LANG ETAL  3,129,388
CATHODE BIAS CLAMP
Filed Dec. 29, 1960  2 Sheets-Sheet 2

INVENTORS
R. E. LANG
C. H. SMITH

BY W. O. Quisenberry
Claude Funkhouser
David E. Everard
ATTORNEYS

United States Patent Office 3,129,388
Patented Apr. 14, 1964

3,129,388
CATHODE BIAS CLAMP
Richard E. Lang, Concord, and Charles H. Smith, Attleboro, Mass., assignors, by mesne assignments, to the United States of America as represented by the Secretary of the Navy
Filed Dec. 29, 1960, Ser. No. 79,476
1 Claim. (Cl. 330—123)

The present invention relates generally to improvements in circuits for electronic amplification and more particularly to new and improved biasing techniques wherein self bias is obtained which is substantially independent of changes in plate current.

In many systems utilizing electron tube circuits, an accurate linear relationship between input and output signals is essential for proper operation. Heretofore, great difficulty has been encounted in achieving accurate linearity without the use of bulky and impractical equipment due to the inherent disadvantages of the various biasing systems. In both self bias and combination bias the degenerative effect of the cathode resistor causes substantial nonlinearity. Although fairly accurate linearity can be obtained with fixed bias, this method obviously requires an additional power supply which increases both the cost and bulk of the equipment.

The present invention relates to a means for overcoming the aforementioned disadvantages by utilizing a single diode or a series combination of diodes in the cathode circuit of an amplifier tube to produce a clamped self bias. The diodes may be used in either the forward conducting direction or in the reverse direction (the Zener region) to produce the required grid to cathode voltage. The result is a self bias that is nearly independent of changes in plate current.

An object of the present invention is to provide a simple and inexpensive self biasing means which is independent of changes in plate current.

Another object of the present invention is to provide a self biasing means of low dynamic resistance.

Still another object of the present invention is to provide an inexpensive and simple device for providing self bias which is unaccompanied by the normal undesirable decrease in gain at low frequencies.

A further object of the invention is to provide a self biasing means for an electronic amplifier in which the stage gain is independent of frequency below the point of inter electrode and diode capacitive contribution.

Other objects and many of the attendant advantages of this invention will be readily appreciated as the same becomes better understood by reference to the following detailed description when considered in connection with the accompanying drawings wherein.

Figure 4:
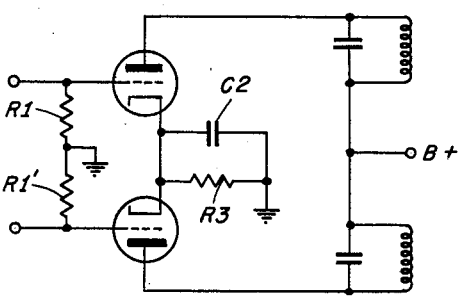
FIG. 4 is a push-pull amplifier circuit incorporating cathode bias with a by-pass capacitor.
Figure 10:
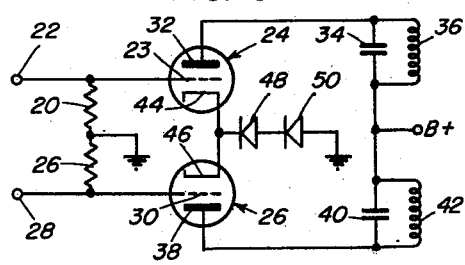
FIG. 10 is a modification of the push-pull circuit of FIG. 4 illustrating the use of the invention clamp.
Figure 11:
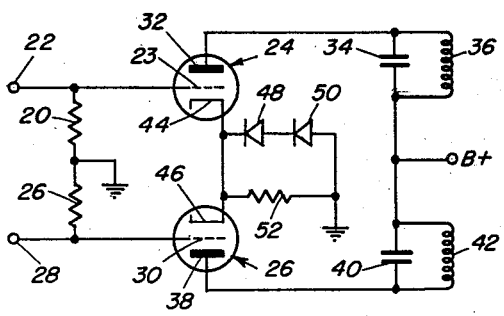
FIG. 11 illustrates a push-pull amplifier having a self-bias resistor in combination with a diode clamp.
Figure 12A:
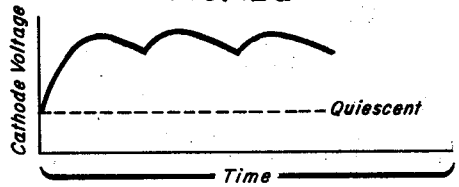
Figure 12B:
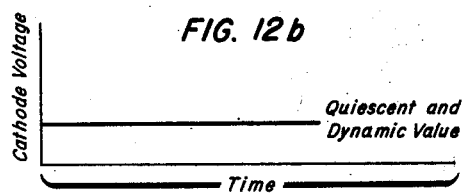
Figure 12C:
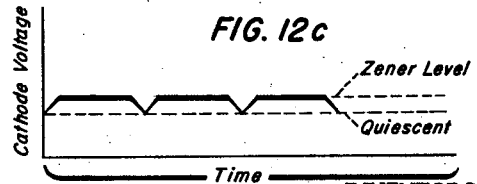

FIGS. 12a, 12b, and 12c illustrate typical cathode voltage curves of the circuits of FIGS. 4, 10, and 11.

Figure 1:
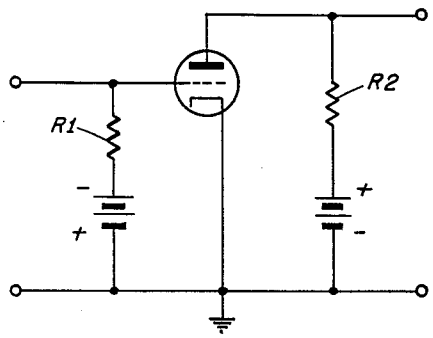
FIG. 1 is a schematic diagram of a circuit showing fixed bias.
Figure 2:
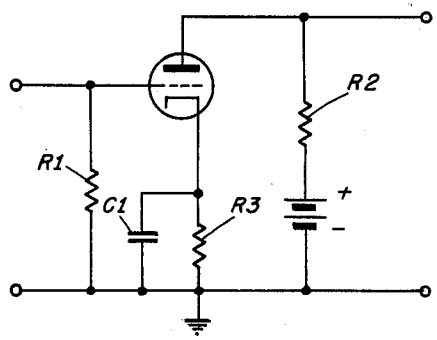
FIG. 2 is a schematic diagram of a circuit wherein self bias is employed.
Figure 3:
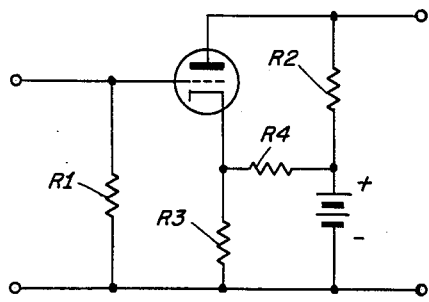
FIG. 3 is a schematic diagram of a circuit which utilizes combination bias.

Referring for the present to FIGS. 1 through 3 of the drawings there are illustrated the three prior art methods of biasing amplifier circuits. FIG. 1 illustrates a typical circuit for fixed bias. As is well known, this type of bias is independent of plate current, and no feedback from the output to the input takes place. With fixed bias it is possible to approach the theoretical gain of the stage $A_t$, where $$A_t = \frac{\mu R_L}{r p + R_L}$$

Although this method enjoys accurate linearity between the output and input it obviously requires an additional power supply.

The curcuit of FIG. 2 illustrates a typical set-up for self bias which, as is well known, is produced by quiescent plate current flowing through the cathode resistor. The changes in plate current, however, are in series with the input signal and thus introduce negative feedback reducing stage gain. A capacitor C1 may be placed across the cathode resistor R3 to increase the gain for a certain frequency range, but the gain then becomes a function of frequency. As the frequency approaches zero (D.C.) the gain approaches the feedback condition, or $$\frac{e_0}{e_{in}} = \frac{\mu R_L}{R_L + rp(\mu+1)Rk}$$

The combination bias method, illustrated in FIG. 3, is subject to poor linearity and further requires relatively large current flow from the main +B supply due to the fact that the cathode resistor R3 must be made small in order to reduce the degenerative effect of the plate current. This becomes readily apparent by reference to the equation $$E_g = R_K(I_p + I_b)$$

where
$E_g$ is grid to cathode voltage (bias),
$R_K$ is the cathode resistor,
$I_p$ is the quiescent plate current, and
$I_b$ is the +B supply current.

Since $I_p$ and $E_g$ are fixed by the proper quiescent operation of the tube the bias current drawn from the +B supply must be increased.

FIG. 4 illustrates a class B push-pull amplifier using a common cathode resistor. As the plate current of the tube increases, the voltage drop across the cathode resistor increases as shown in FIG. 12a and serves to degenerate the input voltage. If an attempt is made to bypass the plate current pulses by placing a capacitor C2 across the cathode resistor as shown in FIG. 4 the gain condition is not improved. Since the pulses are all of the same polarity, the capacitor merely takes the average of these pulses and increases the D.C. grid bias. The capacitor may even charge to the peak voltage depending upon the time constant of the cathode resistor and the shunting capacitor. Thus, a high cutoff voltage is applied to the grids which limits the maximum output.

Figure 5:
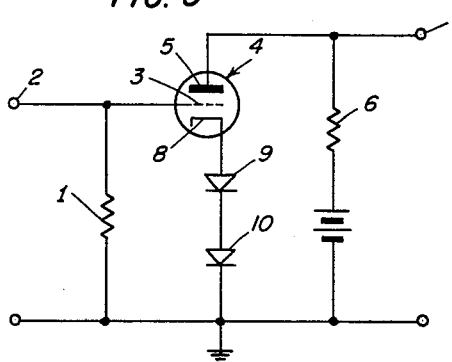
FIG. 5 is a modification of the circuit of FIG. 2 showing the inventive self bias forward diode clamp.

Turning now to FIG. 5 there is shown the cathode clamp circuit of the present invention. In this embodiment a grid resistor 1 has its lower end connected to ground and the other end tied to the input terminal 2 and the grid 3 of tube 4. The plate 5 of tube 4 is tied to +B by load resistor 6 and also serves as an output to terminal 7. The cathode 8 of tube 4 is series connected to ground by diodes 9 and 10.

Figure 7:
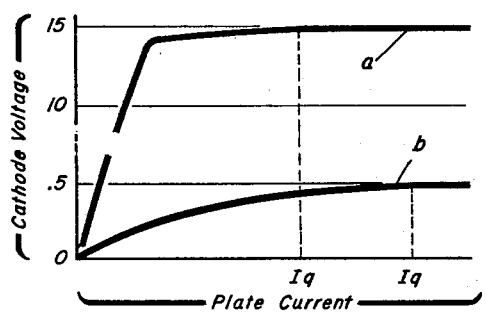
FIG. 7 illustrates typical plate current curves for the circuits of FIGS. 5 and 6.

In the operation of the circuit of FIG. 5 an input signal at terminal 2 causes a voltage to be applied to the grid 3. A certain minimum quiescent plate current is required to place the diodes in the proper operating region (curve "b," FIG. 7). Under these conditions a voltage change on the grid 3 will cause a similar change in the plate current. There will be, however, substantially no change in the cathode voltage due to the fact that changes in diode current above the operating current do not cause appreciable changes in the voltage across the diodes. Therefore, there is practically no degeneration of the input signal and it is possible to approach the maximum theoretical gain $A_t$. Since the shunting capacitor is no longer necessary, the stage gain is independent of frequency up to the point where the interelectrode capacitance of the tube and the capacitive effect of the diodes enter into the gain equation. Furthermore, the undesirable decrease in gain at low frequencies with the use of a by-pass capacitor is eliminated.

Figure 6:
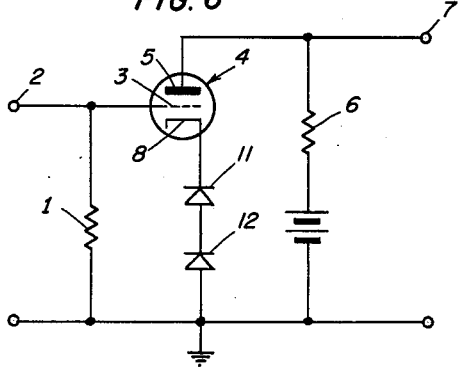
FIG. 6 is a modification of FIG. 5 showing a reverse diode or Zener clamp.
Figure 8:
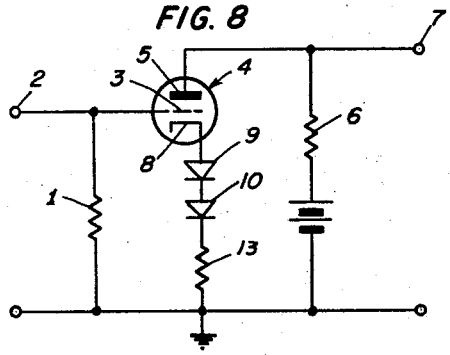
FIG. 8 illustrates another modification of the circuit of FIG. 2 wherein clamped bias is used in combination with controlled degeneration.

The circuit of FIG. 6 is identical to that of FIG. 5 except that the diodes 11 and 12 are used in the reverse direction. The operation of the circuit is similar to that of FIG. 5 except for the different characteristics of the current-voltage curve of the cathode voltage (curve "a," FIG. 7). The difference in the respective current voltage curves is due to the fact that a greater voltage is necessary to produce reverse current flow. The circuit of FIG. 8 is identical to that of FIG. 5 except for the inclusion of the cathode resistor 13 for controlled degeneration. Resistor 13 may, of course, be made variable to facilitate any predetermined amount of degeneration.

The circuit of FIG. 10 illustrates a typical arrangement for the inventive diode clamp in a push-pull amplifier. In this circuit a grid leak resistor 20 connects the input terminal 22 and the grid 23 of tube 24 to ground. Grid resistor 26 serves a similar function in that it connects the input terminal 28 and the grid 30 of tube 26 to ground. The plate 32 of tube 24 is tied to +B by the parallel combination of capacitor 34 and coil 36. In a similar manner the plate 38 of tube 26 is tied to +B by a shunt connection of capacitor 40 and coil 42. The cathodes 44 and 46 of the two tubes 24 and 26 are connected in common and tied to ground by a series combination of diodes 48 and 50.

In operation, the diodes in the cathode circuit maintain the cathode voltage at the quiescent value throughout the swing of the plates of tubes 24 and 26 as shown in FIG. 12(b). The circuit of FIG. 11 is similar both in structure and operation to that of FIG. 10 except for the inclusion of a cathode resistor 52 in shunt with the diodes 48 and 50 which provides an amplifier with a combination of self bias and diode clamping operation. Under quiescent conditions the tube plate current flows through the cathode resistor leaving the diodes non-conducting and consequently dissipating no power. However, as soon as the cathode voltage tends to rise, the diodes conduct and the voltage across the cathode resistor is limited to some pre-set maximum value as shown in FIG. 12c. Another advantageous feature of this circuit is the fact that the quiescent current is determined by the plate current and the cathode resistor; thus, temperature changes in the diodes do not affect the quiescent operating point.

Figure 9:
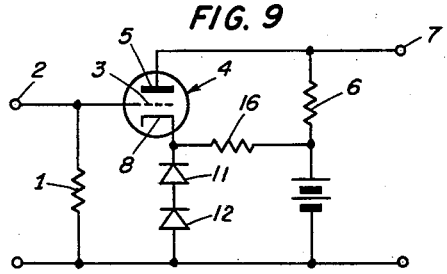
FIG. 9 is the combination bias circuit of FIG. 3 modified to include the inventive self bias clamp.

The foregoing are but a few of the many configurations in which cathode bias clamps may be utilized. Other examples are readily apparent to those skilled in the art and include, by way of example, single ended class A, B, or C stages biased at the proper operating point by a bleeder resistor 16 in the main B supply, as illustrated in FIG. 9. The current from the B supply places the diode current in the desired region and is not restricted by the quiescent plate current.

From the foregoing it is readily apparent that the invention provides highly effective electronic tube circuits that are characterized by substantial linearity over wide ranges of input values by utilizing diodes, which have inherently low dynamic resistance, in the cathode circuits either alone or in combination with a normal cathode resistance. The normal nonlinear portions of the tube characteristics are effectively straightened, thus increasing the range of linearity and affording a wider usable range than has been available heretofore.

Although several embodiments of the present invention have been illustrated, it is obvious that many modifications and variations are possible in the light of the above teachings. It is therefore to be understood that within the scope of the appended claim the invention may be practiced otherwise than as specifically described.

What is claimed is:

An electron amplification system of push-pull configuration comprising a first and a second discharge device each having an anode, a cathode, and a control electrode, input terminals connected to each of said control electrodes, a center tapped resistive means connecting the control electrodes of the first and second discharge devices to ground, a first and a second shunt combination of a capacitive means and an inductive means connecting the anode of said first and second discharge devices respectively to a potential source, a common connection of the cathode elements of said discharge devices, a circuit consisting of a series combination of plural diode means and a resistive means connected in parallel with said plural diode means, said circuit connecting said common connection to ground whereby self bias is provided which is substantially unaffected by low frequency signals and changes in plate current.

References Cited in the file of this patent

UNITED STATES PATENTS

| 2,854,606 | Spiegel | Sept. 30, 1958 |
| 2,888,527 | Follensbee et al. | May 26, 1959 |
| 2,951,208 | Barton | Apr. 30, 1960 |
| 3,068,423 | Hultberg | Dec. 11, 1962 |

FOREIGN PATENTS

| 549,484 | Great Britain | Nov. 24, 1942 |
| 1,089,358 | France | Sept. 29, 1954 |

OTHER REFERENCES

Hoover: RCA TN 199, received in Scientific Library on Aug. 18, 1958.